United States Patent [19]

Lerman

[11] 4,100,119

[45] Jul. 11, 1978

[54] GREATER WATER RESISTANCE AND SHORTER DRYING TIME IN WATER SOLUBLE ENAMEL PAINTS

[75] Inventor: Michael A. Lerman, Park Forest, Ill.

[73] Assignee: Standard Oil Company (Indiana), Chicago, Ill.

[21] Appl. No.: 625,009

[22] Filed: Oct. 20, 1975

[51] Int. Cl.$^2$ .................. B32B 9/02; B32B 15/08; C08L 91/00; C08L 93/00

[52] U.S. Cl. .................. 260/22 CB; 260/26; 427/384; 427/385 R; 428/458; 428/467

[58] Field of Search ............... 260/26, 22 CB

[56] References Cited

U.S. PATENT DOCUMENTS

| | | | |
|---|---|---|---|
| Re. 17,878 | 11/1930 | Durr | 260/26 |
| 1,098,776 | 6/1914 | Arsem | 260/26 |
| 1,667,189 | 4/1928 | Burke | 260/26 |
| 1,722,554 | 7/1929 | Bradley | 260/26 |

OTHER PUBLICATIONS

Du Pont Industrial Chemicals Bulletin – "Tyzor" – 5 pages (1971).
Du Pont product bulletin – "Tyzor" Organic Titanates–Versatile Chemicals for Industry, pp. 25-26 (1972).

*Primary Examiner*—Donald E. Czaja
*Assistant Examiner*—H. H. Fletcher
*Attorney, Agent, or Firm*—Gregory E. Croft; Arthur G. Gilkes; William T. McClain

[57] ABSTRACT

In a water soluble enamel paint composition comprising a water soluble polyester resin, the incorporation of a rosin-ester resin, such as PENTALYN ® 255, into the polyester resin improves the water resistance and drying time of the resulting enamel paint.

8 Claims, No Drawings

GREATER WATER RESISTANCE AND SHORTER DRYING TIME IN WATER SOLUBLE ENAMEL PAINTS

BACKGROUND OF THE INVENTION

1. Field of the Invention

This invention relates to water soluble enamel paint compositions and the water soluble polyester resins used in their preparation. More particularly, it relates to additives which impart improved water resistance and shorter drying times to the resulting enamel paint.

2. Description of the Prior Art

The great majority of enamel paints on the market today are based on organic solvents such as cresylic acid, xylene, and other hydrocarbons. These enamels, while effective in many applications, pose at least two major problems. First, they can be undesirable from a pollution standpoint due to the evaporation of solvent during processing. This creates a need for additional equipment to avoid pollution regulations, which in turn creates additional expense. Second, the solvent-based enamels lack adequate alcohol resistance and gasoline resistance. This is of extreme importance when coating implements such as farm equipment and other heavy machines which are always exposed to gasoline and other solvent spills.

In response to those shortcomings, water soluble enamel paints to replace conventional solvent-based enamels are being sought. These water soluble systems do not have the solvent expense and pollution hazards of their solvent-based counterparts, and they exhibit good alcohol and gasoline resistance. Unfortunately, however, these water soluble enamels lack sufficient water resistance to make them useful in such applications as maintenance enamels, farm implement finishes, and transportation finishes, where the final product is constantly exposed to the elements. In such applications it is desirable that the enamel dry as quickly as possible and be able to resist rain and dampness, since the machines are often painted and immediately stored outdoors.

Accordingly, it is an object of this invention to produce a water soluble enamel paint which exhibits good water resistance.

It is also an object of this invention to produce a water soluble enamel paint which has a fast drying time.

These and other objects will become apparent upon further reading of this specification.

SUMMARY OF THE INVENTION

In one aspect, the invention resides in a water soluble polyester resin for use as an ingredient in water soluble enamel paints, the improvement comprising from 1 to 15 weight percent of a rosin-ester resin, such as a rosin-maleic acid-pentaerythritol resin, which enhances the water resistance of the resulting enamel paint.

More specifically, the invention resides in a water soluble polyester resin which is suitable for water soluble enamel paints, said polyester resin comprising a fatty acid such as linoleic acid, trimethylol propane, isophthalic acid, trimellitic anhydride, and a rosin-maleic acid-pentaerythritol resin.

In another aspect, the invention resides in an improved water soluble enamel paint which contains a polyester resin, the improvement comprising from 1 to 15 weight percent of a rosin-ester resin in said polyester resin resulting in improved water resistance and drying time.

More specifically, the invention resides in a water soluble enamel paint comprising the reaction product of ammonium hydroxide, water, a pH sensitive chelate, and a polyester resin having as ingredients a fatty acid, trimethylol propane, isophthalic acid, trimellitic anhydride and a rosin-maleic acid-pentaerythritol resin such as PENTALYN® 255.

In still another aspect, the invention resides in a method of making a water soluble enamel paint from a water soluble polyester resin, the improvement comprising adding from 1 to 15 weight percent of a rosin-ester resin to said polyester resin, thereby imparting improved water resistance to the resulting enamel paint.

DESCRIPTION OF THE PREFERRED EMBODIMENT

My abandoned application Ser. No. 559,580, filed Mar. 18, 1975, which is hereby incorporated by reference, describes the preparation of water soluble enamel paint compositions through the addition of a pH sensitive chelate which replaces conventional metal drying compounds. It has been found that the water resistance and quickness of dry of such water soluble enamel paints are greatly improved by the incorporation of a rosin-ester resin into the polyester or alkyd ingredient of the enamel paint composition. It is believed that during curing of the enamel the rosin-ester component migrates to the surface to create a barrier coat which imparts the desired water resistance after the paint has dried. The particular rosin-ester which is preferred is a rosin-maleic acid-pentaerythritol resin sold by Hercules, Incorporated under the tradename PENTALYN® 255. This rosin ester has good compatibility with the water soluble alkyd and gives excellent properties. It has the following typical properties, taken from a Hercules Product Data Sheet No. 741-8:

| | |
|---|---|
| Softening point (Hercules drop method), °C | 171 |
| Acid number | 196 |
| 60% solids solution in 2B ethyl alcohol | |
|    Color (Gardner) | 5.5 |
|    Viscosity (Gardner-Holdt) at 25° C | J |
| 15% solids in dilute aqueous ammonia | |
|    Color (Gardner) | 4.5 |
| Weight per gallon at 25° C, lbs. | 9.5 |

Water Soluble Alkyd Preparation

The preferred water soluble alkyd formulation is as follows:

| Ingredients | Parts by Weight |
|---|---|
| Linoleic fatty acid | 357 |
| Trimethylol propane | 335 |
| Isophthalic acid | 299 |
| Trimellitic anhydride | 99 |
| | 1090 |
| Less water of reaction | −90 |
| | 1000 |
| PENTALYN® 255 | 50 |

The fatty acid, trimethylol propane, and isophthalic acid were first added to the reaction kettle. The contents were rapidly heated with agitation to 350° F where esterification began. The heat was continued for 3 hours until the temperature reached 460° F and held there until the acid number went below 10. The contents were then cooled to 360° F and the trimellitic anhydride was added. The temperature was held between 340° and 350° F. until a 50–65 acid number and 20 second cure was obtained. The contents were then cooled to 310° F., at which point the 5 wt. percent PENTALYN ® 255 was melted in about 10 minutes. The resulting resin was cut to 75% solids in equal parts Butyl Cellosolve/butanol, therefore having 75% N.V.M. (non-volatile material).

The resulting water soluble alkyd had the following properties:

| | |
|---|---|
| Acid number (solids) | 54.0 |
| Viscosity (Gardner-Holdt) | $Z_{10}$ |
| Cure at 200° C | 18 seconds |
| Color (Gardner) | 4 |

Water Soluble Enamel Preparation

The preferred water soluble enamel formulation is as follows:

| Ingredients | Parts by weight |
|---|---|
| Alkyd resin (75% N.V.M.) | 320.9 |
| Ammonium hydroxide (28%) | 20.0 |
| Water | 438.2 |
| pH sensitive chelate | 2.9 |
| Pigment (TiO$_2$) | 216.0 |
| Flow agent | 0.5 |
| Anti-skin agent | 1.0 |
| Drier accelerator | 0.5 |
| | 1000.0 |

The alkyd resin was first solubilized with the ammonium hydroxide and diluted with three-fourths of the water. The drier accelerator (Active 8, R. T. Vanderbilt Co.), anti-skin agent (Exkin No. 2, Nuodex Div., Tenneco Chemicals, Inc.), and flow agent (FC-430, 3M Company) were then added and thoroughly mixed. The pigment was slowly stirred in while adding the remaining water. The resulting paste was charged to a pebble mill and ground until a 7 Hegman grind was obtained. The pH sensitive chelate having a composition of about 80 weight percent triethanol amine titanate in isopropanol (Tyzor TE, E. I. du Pont de Nemours & Co.) was then stirred in and the mixture put on a roller for 5 minutes to ensure complete dispersion. Water was added to adjust the viscosity to 40–50 seconds No. 4 Ford Cup (spraying viscosity).

Testing

Standard paint testing was employed to evaluate the resulting enamel which was spray applied on cold rolled steel to a thickness from 1.0 to 1.2 mils. The drying characteristics were as follows:

| | PENTALYN ® 255 modified | Control |
|---|---|---|
| Set to touch | 3 minutes | 15 minutes |
| Tack free | 15 minutes | 45–60 minutes |
| Dry hard | 45 minutes | 1.5–2 hours |

The results of the water spot testing and water immersion testing for the modified enamel paint of this invention are given in Tables I and II, respectively. The results of the water immersion testing of the control, i.e., the same composition without the PENTALYN ® 255, are given in TABLE III. No water spot testing of the control formulation was done.

These data illustrate the great improvements in drying time and water resistance exhibited by the modified enamels of this invention. When compared with the control, the modified enamel dried hard over 50% faster (45 min. vs. 1.5 to 2 hrs.) and endured the water immersion test at least 500% longer (200 hrs. vs. 38 hrs.) then the unmodified enamel. The maximum length of time which the modified enamel can withstand the water immersion test has not yet been determined. These test results show that the modified enamel paints of this invention have excellent potential for use in markets such as maintenance enamels, farm implement finishes, and transportation finishes.

It will be obvious to those skilled in the art that many variations may be made from the preferred embodiment chosen for purposes of illustration without departing from the scope of this invention.

TABLE I

| | Water Spot Testing PENTALYN ® 255 Modified | Recovered |
|---|---|---|
| Air Dried 2 Hours Before Testing | | |
| Gloss at 60° | 90+ | |
| Sward Hardness | | |
| Pencil Hardness | | |
| Impact (direct-reverse) | | |
| 30 min. water spot | haze-extreme softening no wrinkling | Yes (24 hours) |
| 1 hour water sot | haze-extreme softening no wrinkling | Yes (24 hours) |
| Air Dried/Force Cured for ½ hour at 100° F. | | |
| Gloss at 60° | 90+ | |
| Sward Hardness | | |
| Pencil Hardness | | |
| Impact (direct-reverse) | | |
| 30 min. water sot | sl. haze-no wrinkling | Yes (10 min.) |
| 1 hour water spot | sl. haze-no wrinkling | Yes (10 min.) |
| Force Cured 10'/165° F | | |
| Gloss at 60° | 90+ | |
| Sward Hardness | 8 | |
| Pencil Hardness | 5B | |
| Impact (direct-reverse) | 60, 30 | |
| 1 hour water spot | softened | Yes (24 hours) |
| Force Cured 5'/200° F | | |
| Gloss at 60° | 90+ | |
| Sward Hardness | 10 | |
| Pencil Hardness | 5B | |
| Impact (direct, reverse) | 60, 30 | |
| 1 hour water spot | softened | Yes (24 hours) |
| Force Cured 5'/250° F | | |
| Gloss at 60° | 90+ | |
| Sward Hardness | 12 | |
| Pencil Hardness | 5B | |
| Impact (direct-reverse) | 65, 40 | |
| 1 hour water spot | softened | Yes (24 hours) |
| Force Cured 2'/300° F | | |
| Gloss at 60° | 90+ | |
| Sward Hardness | 12 | |
| Pencil Hardness | 4B | |
| Impact (direct-reverse) | 70, 40 | |
| 1 hour water spot | softened | Yes (24 hours) |
| Air Dried 24 hours Before Testing | | |
| Gloss at 60° | 90+ | |
| Sward Hardness | 14 | |
| Pencil Hardness | 4B | |
| Impact (direct, reverse) | 30,15 | |
| 30min. water spot | softened-no wrinkling | Yes (24 hours) |
| 1 hour water spot | softened-no wrinkling | Yes (24 hours) |
| Air Dried 48 Hours Before Testing | | |
| Gloss at 60° | 90+ | |
| Sward Hardness | 18 | |
| Pencil Hardness | 4B | |
| Impact (direct-reverse) | 2, 10 | |
| 30 min. water spot | softened-no wrinkling | Yes (24 hors) |
| 1 hour water spot | softened-no wrinkling | Yes (24 hours) |

TABLE II

Water Immersion Testing

| | PENTALYN ® 255 Modified | Recovered |
|---|---|---|
| Air Dried 4 Days Before Testing | | |
| Gloss at 60° | 90+ | |
| Sward Hardness | 24 | |
| Pencil Hardness | 2B | |
| Impact (direct-reverse) | 20, 10 | |
| 72 Hrs. water immersion | passed (no change) | |
| 96 Hrs. water immersion | sl. softening | Yes (24 hours) |
| 150 hrs. water immersion | sl. haze, sl. softening, sl. wrinkling | Yes (24 hours) |
| 200 hrs. water immersion | sl. haze, sl. softening sl. wrinkling | Yes (24 hours) |
| Air Dried 7 Days Before Testing | | |
| Gloss at 60° | 90+ | |
| Sward Hardness | 30 | |
| Pencil Hardness | HB | |
| Impact (direct, reverse) | 20, 10 | |
| 72 hrs. water immersion | passed (no change) | |
| 96 hrs. water immersion | very sl. softening | Yes (24 hours) |
| 150 hrs. water immersion | very sl. softening, sl. wrinkling | Yes (24 hours) |
| 200 hrs. water immersion | very sl. softening, sl. wrinkling | Yes (24 hours) |

TABLE III

Water Immersion Testing (Control)

| Force Cured 10 min. at 165° F. | Control | Recovered |
|---|---|---|
| 4 hrs. water immersion | film separated from substrate | |
| Air Dried 24 hrs. | | |
| 2 hrs. water immersion | severe wrinkling | No |
| Air Dried 48 hrs. | | |
| 24 hrs. water immersion | film separated from substrate | |
| Air Dried 4 days | | |
| 38 hrs. water immersin | film separated from substrate | |

I claim:

1. A water soluble polyester resin suitable as an ingredient in water soluble enamel paints comprising the reaction product of a fatty acid, trimethylol propane, isophthalic acid, trimellitic anhydride, and from 1 to 15 weight percent of a rosin-ester resin (based on the amount of polyester resin), said rosin-ester resin comprising the reaction product of rosin, maleic acid, and pentaerythritol.

2. The polyester resin of claim 1 wherein the fatty acid is linoleic acid.

3. The polyester resin of claim 1 wherein the amount of said rosin-ester is about 5 weight percent.

4. The polyester resin of claim 3 wherein the fatty acid is linoleic acid.

5. A water soluble enamel point having good water resistance comprising the reaction product of ammonium hydroxide, water, a pH sensitive chelate of about 80 weight percent triethanolamine titanate in isopropanol, and a polyester resin comprising the reaction product of a fatty acid, trimethylol propane, isophthalic acid, trimellitic anhydride, and from 1 to 15 weight percent of a rosin-ester resin (based on the amount of polyester resin), said rosin-ester resin comprising the reaction product of rosin, maleic acid, and pentaerythritol.

6. The paint composition of claim 5 wherein the fatty acid is linoleic acid.

7. The paint composition of claim 5 wherein the amount of rosin-ester resin is about 5 weight percent based upon the amount of polyester resin.

8. The paint composition of claim 7 wherein the fatty acid is linoleic acid.

* * * * *

UNITED STATES PATENT OFFICE
CERTIFICATE OF CORRECTION

Patent No. 4,100,119            Dated JULY 11, 1978

Inventor(s) MICHAEL A. LERMAN

It is certified that error appears in the above-identified patent and that said Letters Patent are hereby corrected as shown below:

Column 4, Line 7, "then" should be --than--

Column 4, Line 25-30, "sot" should be --spot--

Column 4, Line 30-35, "sot" should be --spot--

Column 4, Line 64, "hors" should be --hours--

Column 6, Line 23, "point" should be --paint--

Signed and Sealed this

Thirtieth Day of January 1979

[SEAL]

Attest:

RUTH C. MASON
Attesting Officer

DONALD W. BANNER
Commissioner of Patents and Trademarks